US012722489B1

(12) United States Patent
Jacob et al.

(10) Patent No.: US 12,722,489 B1
(45) Date of Patent: Sep. 1, 2026

(54) SYSTEMS AND METHODS FOR DISPLAYING VEHICLE REGULATIONS

(71) Applicant: UIPCO, LLC, San Antonio, TX (US)

(72) Inventors: Rincy Rose Jacob, Garland, TX (US); Carlos JP Chavez, San Antonio, TX (US); Christopher Alan Crawford, Keller, TX (US); Seth E. Ethington, Prosper, TX (US); Evan William Eldridge Gallagher, San Antonio, TX (US)

(73) Assignee: UIPCO, LLC, San Antonio, TX (US)

( * ) Notice: Subject to any disclaimer, the term of this patent is extended or adjusted under 35 U.S.C. 154(b) by 0 days.

(21) Appl. No.: 18/955,484

(22) Filed: Nov. 21, 2024

Related U.S. Application Data

(60) Provisional application No. 63/604,533, filed on Nov. 30, 2023.

(51) Int. Cl.
*B60K 35/28* (2024.01)
*B60W 50/14* (2020.01)

(52) U.S. Cl.
CPC ............ *B60K 35/28* (2024.01); *B60W 50/14* (2013.01); *B60K 2360/16* (2024.01); *B60K 2360/1868* (2024.01); *B60K 2360/592* (2024.01); *B60W 2050/146* (2013.01); *B60W 2555/60* (2020.02); *B60W 2556/50* (2020.02)

(58) Field of Classification Search
CPC ........... B60K 35/28; B60K 2360/1868; B60K 2360/592; B60K 2360/16; B60W 50/14; B60W 2556/50; B60W 2555/60; B60W 2050/146
See application file for complete search history.

(56) References Cited

U.S. PATENT DOCUMENTS 6,516,273 B1 * 2/2003 Pierowicz ........ G08G 1/096783 340/929
10,147,324 B1 * 12/2018 Kuffner, Jr. .......... G08G 1/0962
10,573,175 B2 * 2/2020 Kaneshige ........... G06V 20/582
2002/0036572 A1 * 3/2002 Yamaki .................. G08G 1/052 340/901
2009/0146846 A1 * 6/2009 Grossman ............... B60R 25/04 340/988
2009/0224942 A1 * 9/2009 Goudy ................... G08G 1/164 340/905

(Continued)

FOREIGN PATENT DOCUMENTS

CN 100524383 C * 8/2009
CN 107344499 A * 11/2017 ......... G01C 21/3697
CN 110888432 A * 3/2020 ......... G01C 21/3658

*Primary Examiner* — Chico A Foxx
(74) *Attorney, Agent, or Firm* — Fletcher Yoder, P.C.

(57) ABSTRACT

A vehicle regulation system includes a display and processing circuitry. The processing circuitry is configured to receive a first set of regulation data associated with a first geographical area and a second set of regulation data associated with a second geographical area, and compare the first set of regulation data and the second set of regulation data. The processing circuitry is also configured to identify a mismatched regulation based on the comparison, determine location data associated with a location of operation of a vehicle is associated with the mismatched regulation, and display the mismatched regulation.

20 Claims, 6 Drawing Sheets

(56) References Cited

U.S. PATENT DOCUMENTS

| | | | | |
|---|---|---|---|---|
| 2013/0207794 | A1* | 8/2013 | Patel | B60K 35/10 340/425.5 |
| 2014/0309864 | A1* | 10/2014 | Ricci | G06F 16/951 701/36 |
| 2015/0211875 | A1* | 7/2015 | Alduaiji | G01C 21/3492 701/487 |
| 2016/0061625 | A1* | 3/2016 | Wang | G01C 21/3697 701/454 |
| 2016/0232785 | A1* | 8/2016 | Wang | G08G 1/0129 |
| 2017/0243483 | A1* | 8/2017 | Kaneshige | G06V 10/803 |
| 2017/0308761 | A1* | 10/2017 | Gillet | G06F 18/22 |
| 2018/0283897 | A1* | 10/2018 | Wang | G06Q 30/0214 |
| 2019/0025826 | A1* | 1/2019 | Lin | H04W 4/44 |
| 2019/0379761 | A1* | 12/2019 | Acosta | H04L 65/1063 |
| 2020/0238998 | A1* | 7/2020 | Dasalukunte | G08G 1/0969 |
| 2025/0153735 | A1* | 5/2025 | Li | G06V 20/56 |

* cited by examiner

SYSTEMS AND METHODS FOR DISPLAYING VEHICLE REGULATIONS

CROSS-REFERENCE TO RELATED APPLICATION

The present patent application claims priority to and the benefit of U.S. Provisional Patent Application No. 63/604,533, entitled "SYSTEMS AND METHODS FOR DISPLAYING VEHICLE REGULATIONS" and filed on Nov. 30, 2023, the disclosure of which is incorporated by reference herein in its entirety for all purposes.

BACKGROUND

The present disclosure is related to providing vehicle regulation data to a driver. More specifically, the present disclosure is related to identifying a vehicle regulation to present and display to the driver.

An inability to read an unfamiliar (e.g., foreign) language or understand unfamiliar (e.g., foreign) signs while driving in another country may pose challenges and safety concerns for travelers. Drivers may experience difficulty in navigating unfamiliar roads and following traffic regulations when signage and road markings are displayed in a foreign language unfamiliar to the drivers. Thus, the drivers may experience an increased risk of traffic violations, car accidents, and delays in reaching destinations. Further, the drivers may experience stress, which may diminish their ability to efficiently navigate through unfamiliar territory. Accordingly, it is desirable to provide a method of identifying a vehicle regulation and presenting the vehicle regulation in a manner that may enable the driver to understand and follow the vehicle regulation.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statement are to be read in this light, and not as admission of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a vehicle regulation system includes a display and processing circuitry. The processing circuitry is configured to receive a first set of regulation data associated with a first geographical area and a second set of regulation data associated with a second geographical area, and compare the first set of regulation data and the second set of regulation data. The processing circuitry is also configured to identify a mismatched regulation based on the comparison, determine location data associated with a location of operation of a vehicle is associated with the mismatched regulation, and display the mismatched regulation.

In one embodiment, a method includes receiving, via processing circuitry, a first set of regulation data associated with a first geographical area and a second set of regulation data associated with a second geographical area, comparing, via the processing circuitry, the first set of regulation data and the second set of regulation data to identify a mismatched regulation, and identifying, via the processing circuitry, a mismatched regulation based on the comparison. The method also includes determining, via the processing circuitry, location data associated with a location of operation of a vehicle is associated with the mismatched regulation, and displaying, via the processing circuitry, the mismatched regulation.

In one embodiment, one or more tangible, non-transitory computer-readable media storing instructions that, when executed by processing circuitry, are configured to cause the processing circuitry to receive a first set of regulation data associated with a first geographical area and a second set of regulation data associated with a second geographical area, and compare the first set of regulation data and the second set of regulation data. The instructions, when executed by the processing circuitry, are also configured to cause the processing circuitry to identify a mismatched regulation based on the comparison, determine location data associated with a location of operation of a vehicle is associated with a mismatched regulation, and display the mismatched regulation.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
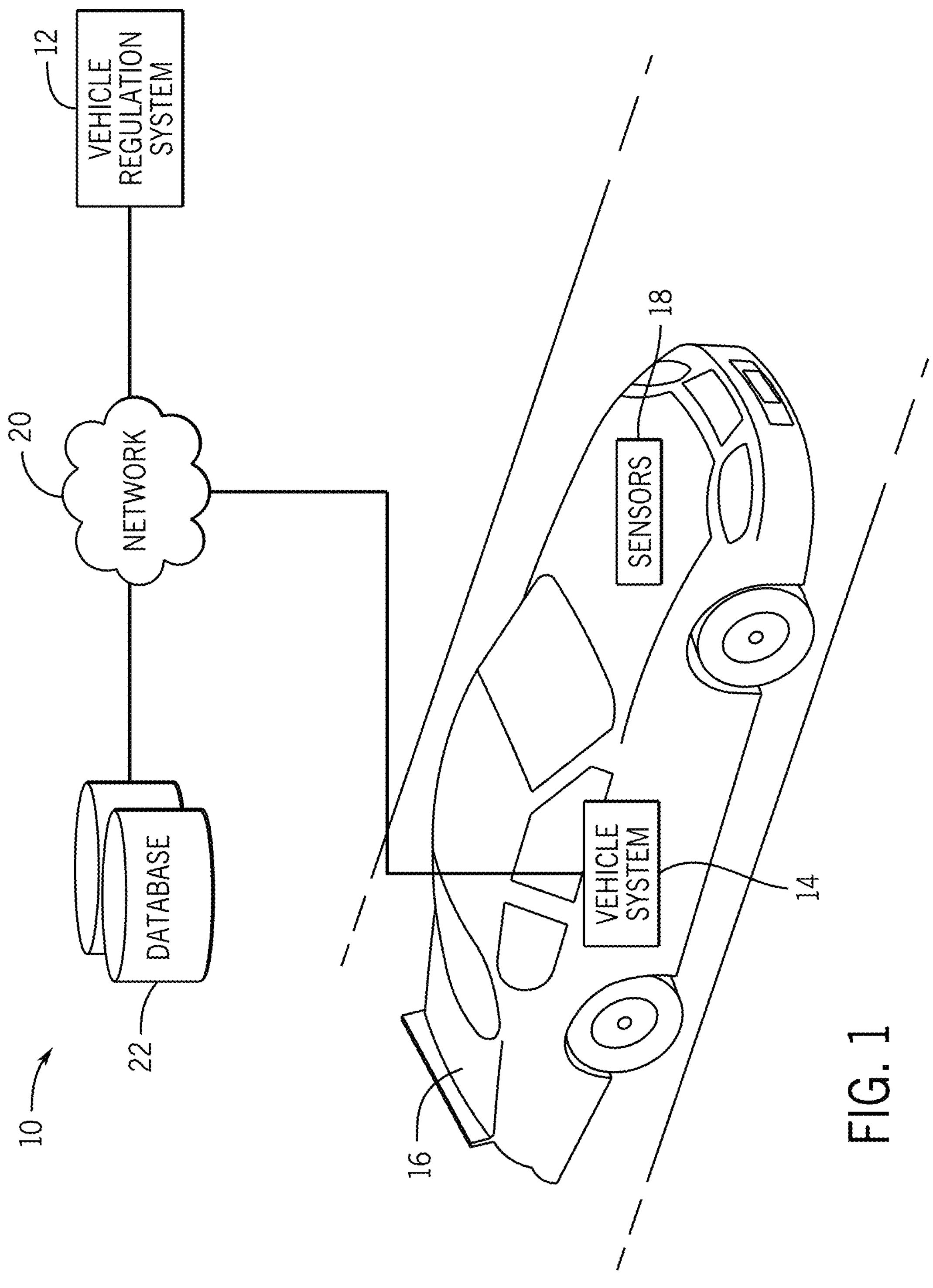
FIG. 1 is a diagram of a system for sending data to and receiving data from a vehicle regulation system, in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As discussed above, an inability to read an unfamiliar (e.g., foreign) language or understand unfamiliar (e.g., foreign) signs while driving (e.g., in another country) may cause drivers to experience difficulty in navigating unfamiliar roads and/or following traffic regulations. Drivers may experience an increased risk of traffic violations, car accidents, and delays in reaching destinations. Therefore, it may be beneficial to provide a method of identifying a vehicle regulation and presenting the vehicle regulation in a manner that may enable the driver to understand and follow the vehicle regulation.

With the foregoing in mind, the present disclosure is related to a vehicle regulation system that identifies and translates vehicle regulations and displays the translated vehicle regulations to the driver. The vehicle regulation system may identify a geographical area associated with an operator of a vehicle and query a database using a key associated with the operator's geographical area to obtain operator regulation data associated with the operator's geographical area. Additionally, the vehicle regulation system may identify a geographical area associated with operation of the vehicle and query the database using a key associated with the operational geographical area to obtain vehicle operation regulation data associated with the operational geographical area. The vehicle regulation system may then compare the operator regulation data with the vehicle operation regulation data to identify mismatched regulation data between the operator regulation data and the vehicle operation regulation data. Further, the vehicle regulation system may determine whether real-time location data is associated with a real-time location of the operation of the vehicle and determine whether the real-time location data is associated with the mismatched regulation data. The vehicle regulation system may then determine an upcoming mismatched regulation indication to present, a time of display, and a location of the display based on a portion of the mismatched regulation data associated with the real-time location data. Moreover, the vehicle regulation system may generate and display the mismatched regulation indication at a determined time and location. In an embodiment, the vehicle regulation system may store an indication of the mismatched regulation indication, determined time and location, the real-time location, and an indication of the operator's geographical area and the operational geographic area.

In another embodiment, the vehicle regulation system may display the mismatched regulation indication stored in the database. The vehicle regulation system may identify the real-time location of the operation of the vehicle. The vehicle regulation system may then query the mismatched regulation indication based upon the real-time location of the vehicle. Further, the vehicle regulation system may determine whether the mismatched regulation indication is associated with the real-time location identified in the database. If the mismatched regulation indication is associated with the real-time location identified in the database, then the vehicle regulation system may display the identified mismatched regulation indication as indicated in the database. However, if the mismatched regulation indication is not associated with the real-time location identified in the database, then the vehicle regulation system may proceed to performing a mismatched regulation indication generation as described above.

By way of introduction, FIG. 1 illustrates a diagram of a system 10 that includes a vehicle regulation system 12 communicating with a vehicle system 14 of a vehicle 16. The vehicle 16 may include a wide variety of sensors 18 (e.g., a camera, sound sensor, vibration sensor, location sensor, radio-frequency identification (RFID) sensor, and so on) disposed within or outside of the vehicle 16. The sensors 18 may monitor operations of the vehicle 16 and collect operating parameters of the vehicle 16. The sensors 18 may include any type of device capable of detecting an environment (e.g., geographic area, location) of the vehicle 16. In some embodiments, the sensors 18 may also be disposed on devices carried by or worn by individuals in the vehicle 16. For example, the sensors 18 may be disposed on mobile phones, wearable electronics, and the like.

In an embodiment, the sensors 18 may provide location information regarding the vehicle 16. That is, the sensors 18 may be any suitable sensor, which may provide real-time location data of the vehicle 16 to the vehicle regulation system 12. For example, the sensors 18 may provide global positioning system (GPS) coordinates and the like to indicate a location of the vehicle 16. In some embodiments, the sensors 18 may include a video system (e.g., image and audio sensors that collect image data and/or audio data), which may capture real-time area data (e.g., traffic signage surrounding the vehicle, symbol signage, traffic lights, and the like) and/or audio data at a street level. In some embodiments, the video system may include an image sensor or any suitable camera to capture real-time image data of an environment and/or vehicle surrounding.

As shown in FIG. 1, the system 10 may include a network 20 that may receive relevant data from a variety of data sources and transmit the data received to the vehicle regulation system 12. For example, the network 40 may receive data regarding a location of the vehicle 16, an operator of the vehicle 16, and/or other properties related to the vehicle 16. The vehicle regulation system 12 may communicate with the vehicle system 14 to collect sensor data of the sensors 18 directly or via the network 20. The vehicle regulation system 12 may use the collected sensor data to determine an upcoming regulation (e.g., a vehicle regulation) indication to present to the operator of the vehicle 16.

Additionally, relevant data may be gathered from a database 22 of the system 10. For example, the database 22 may track or receive information related to a geographical area, the operator of the vehicle 16, real-time location data of the vehicle 16, vehicle operation regulation data, a time associated with the real-time location data of the vehicle 16, and so on. Furthermore, the database 22 may track or receive information related to area data (e.g., regarding traffic regulations), social event data (e.g., text-based social media posts, pictures, videos of traffic events), news (e.g., weather, social events), user personal data (e.g., user transactions, a geographical region associated with the user, experiences, records).

Moreover, the database 22 may include data available via social media sites such as Facebook®, Twitter®, and the like. The database 22 may also include data trending on social media sites that may not be directly associated with any particular measurement described above. However, the trending data may provide the vehicle regulation system 12 additional data that may be related to the data collected from the sources described above. For instance, the data from the database 22 may include information regarding a natural phenomenon or any situation and may be correlated or verified with data acquired from the sensors or devices mentioned above or other suitable devices and sensors. The database 22 may include information provided by various news services that may be updated in real-time or near real time via a network (e.g., Internet). The database 22 may provide information regarding weather alerts, natural phenomenon alerts, non-natural phenomenon alerts (e.g., traffic, active shooter), and any other information that may be published via an electronic news outlet such as a webpage, news database, or the like. The database 22 may include information associated with the individuals, businesses, organizations, governmental agencies, news outlets, and the like. For example, as described above, the database 22 may include information related to the geographical area associated with the operator of the vehicle 16 and/or vehicle regulation data of the geographical area associated with the operator. As another example, the database 22 may include vehicle operation regulation data associated with an operational geographical area (e.g., an area where the operator is operating the vehicle 16).

The vehicle 16 may include a smart glass (e.g., smart windows, switchable windows, dynamic windows, and the like), embedded in a front cabin of the vehicle 16 and/or in a back cabin of the vehicle 16, that may operate to change the color of the glass (e.g., an electrochromic glass) and/or display data. The electrochromic smart glass may operate to change the color of the glass by applying an electrical voltage to the glass. The opacity of the electrochromic smart glass may be controlled by changing the amount of electrical voltage being applied to the glass. For example, applying a low voltage of electricity may cause a coating within the electrochromic smart glass to darken. Further, removing the voltage of electricity may cause the glass to lighten and reverse to its clear state. The smart glass may also include a heads-up display (HUD) for displaying data to a passenger of the vehicle 16. The HUD may operate by projecting an image onto the vehicle's windows. However, it should be noted that any other smart glass may be employed in the embodiments described herein.

The vehicle 16 may also include smart mirrors embedded in a driver's left side mirror, right side mirror, and/or interior rearview mirror, that may operate to display data to the driver. The smart mirrors may feature a two-way mirror, digital display behind a glass, and a computer. The computer within the smart mirrors may connect to the vehicle regulation system 12 to send and receive data from the network 20. For example, the smart mirrors may receive data of the traffic regulation that is approaching and display the data to the driver via the digital display of the smart mirror.

In some embodiments, a vehicle driver may be provided translated regulations via augmented reality electronic devices worn by the driver. For example, identified regulations may be provided via augmented reality glasses.

Figure 2:
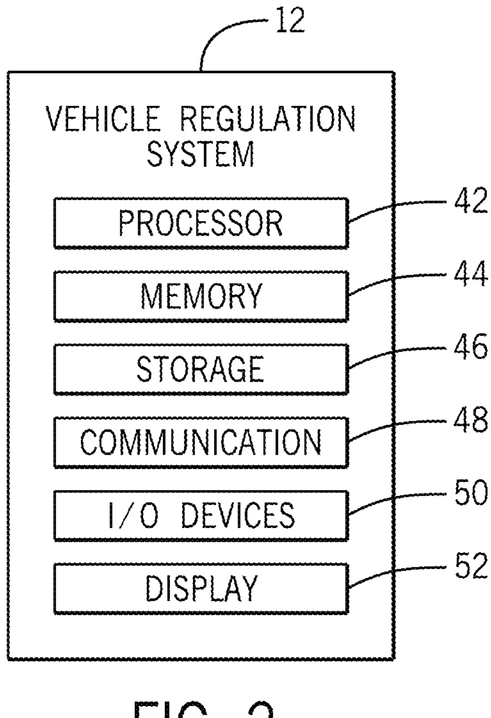
FIG. 2 is a block diagram of example components within the vehicle regulation system, in accordance with aspects of the present disclosure.

FIG. 2 is a block diagram of example components within the vehicle regulation system 12, in accordance with embodiments of the present disclosure. The vehicle regulation system 12 may include a processor 42, a memory 44, a storage 46, a communication component 48, input/output (I/O) devices 50, and a display 52. The processor 42 may be any type of computer processor or microprocessor capable of executing computer-executable code. The processor 42 may also include multiple processors or processing circuitry that may perform the operations described below.

The memory 44 and the storage 46 may be any suitable articles of manufacture that can serve as media to store processor-executable code, data, or the like. These articles of manufacture may represent computer-readable media (e.g., any suitable form of memory or storage) that may store the processor-executable code used by the processor 42 to perform the presently disclosed techniques. The memory 44 and the storage 46 may also be used to store data described, various other software applications for analyzing the data, and the like. The memory 44 and the storage 46 may represent non-transitory computer-readable media (e.g., any suitable form of memory or storage) that may store the processor-executable code used by the processor 42 to perform various techniques described herein. It should be noted that non-transitory merely indicates that the media is tangible and not a signal.

The communication component 48 may be a wireless or wired communication component that may facilitate communication between the vehicle regulation system 12, the vehicle system 14, the network 20, various types of devices, and the like. Additionally, the communication component 48 may facilitate data transfer to the vehicle regulation system 12, such that the vehicle regulation system 12 may receive data from the other components depicted in FIG. 1 and the like. The communication component 60 may use a variety of communication protocols, such as Open Database Connectivity (ODBC), TCP/IP Protocol, Distributed Relational Database Architecture (DRDA) protocol, Database Change Protocol (DCP), HTTP protocol, other suitable current or future protocols, or combinations thereof.

The I/O devices 50 may be interfaces that may couple to other peripheral components such as input devices (e.g., keyboard, mouse), sensors, input/output (I/O) modules, and the like. The display 52 may operate as a human machine interface (HMI) to depict visualizations associated with software or executable code being processed by the processor 42. The display 52 may operate to depict a representation of a mismatched regulation, and other related information. In one embodiment, the display 52 may be a touch display (e.g., a user interface) capable of receiving inputs from a user of the vehicle regulation system 12. The display 52 may be any suitable type of display, such as a liquid crystal display (LCD), plasma display, or an organic light emitting diode (OLED) display, for example. Additionally, in one embodiment, the display 52 may be provided in conjunction with a touch-sensitive mechanism (e.g., a touch screen) that may function as part of a control interface for the vehicle regulation system 12.

It should be noted that the components described above with regard to the vehicle regulation system 12 are exemplary components and the vehicle regulation system 12 may include additional or fewer components as shown. In addition, although the components are described as being part of the vehicle regulation system 12, the components may also be part of any suitable computing device described herein to perform the various operations described herein.

Figure 3:
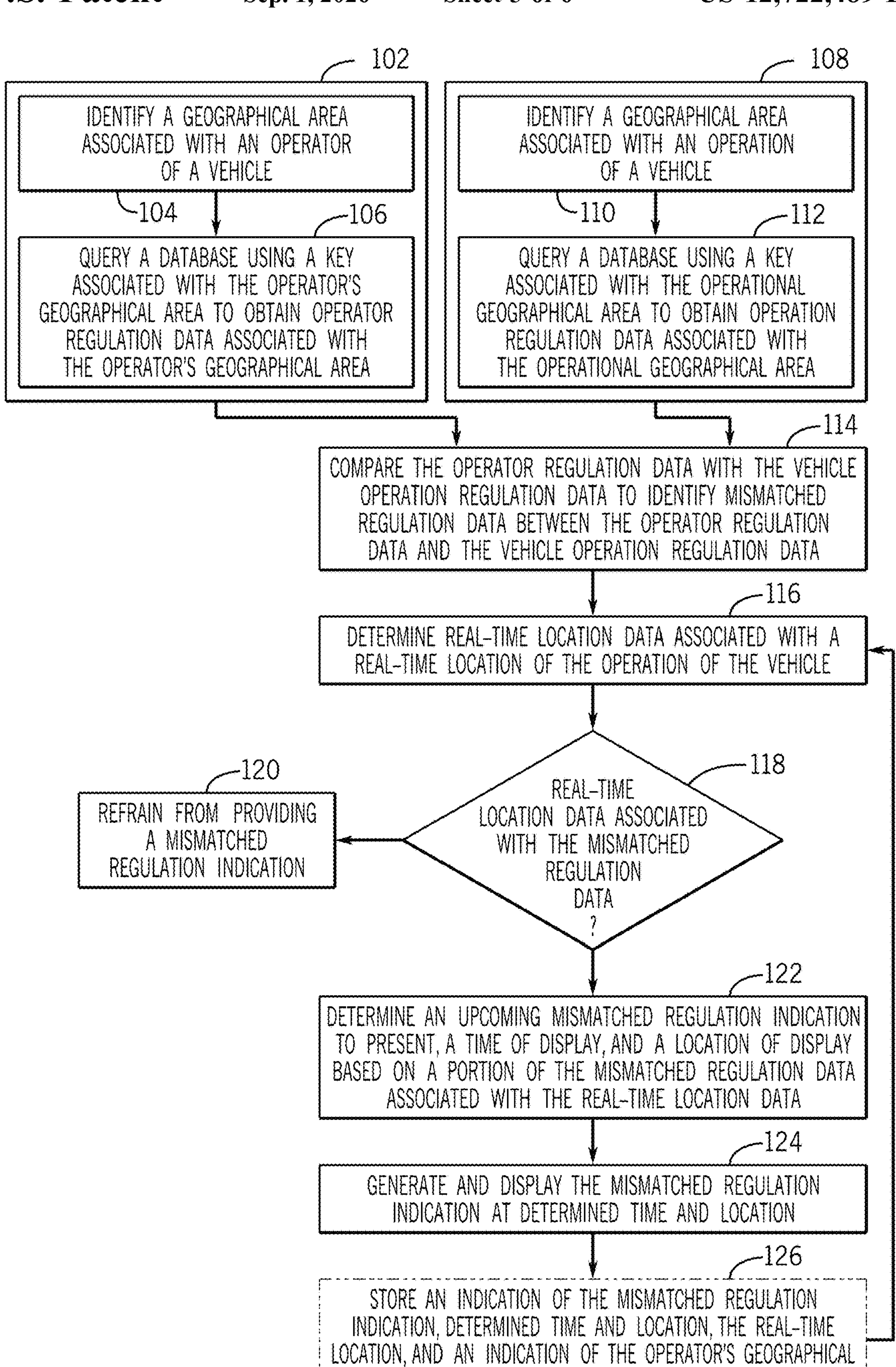
FIG. 3 is a flowchart of a method for generating and displaying a mismatched regulation indication using the vehicle regulation system of FIG. 1, in accordance with aspects of the present disclosure.

FIG. 3 is a flowchart of a method 100 for generating and displaying a mismatched regulation indication using the vehicle regulation system 12 of FIG. 1, in accordance with aspects of the present disclosure. Although the following description of the method is described in a particular order, it should be noted that the method 100 is not limited to the depicted order, and instead, the method 100 may be performed in any suitable order. In addition, although the vehicle regulation system 12 is described as performing the method 100, it should be understood that the method 100 may be performed by any suitable computing device or computing system.

At process block 102, the vehicle regulation system 12 may obtain operation regulation data associated with an operator's geographical area. That is, at process block 104, the vehicle regulation system 12 may identify a geographical area associated with an operator of the vehicle 16. For example, the vehicle regulation system 12 may receive an input from the operator transmitted to the network 20 via the vehicle system 14 or via a mobile device of the operator indicative of the geographical area the operator is associated with.

At process block 106, the vehicle regulation system 12 may query the database 22 using a key associated with the operator's geographical area to obtain operator regulation data associated with the operator's geographical area (e.g., city, state, country, and so on). The key may include a unique identifier for each record stored in a table, which may include any number of columns within the database 22. To query the database 22 using the key, the vehicle regulation system 12 may utilize a particular query language. As an example, the vehicle regulation system 12 may use structured query language (SQL). The vehicle regulation system 12 may query the database 22 using the key associated with the identified operator geographical area, and the database 22 may return (via a database management system) a corresponding record containing the operator regulation data associated with the key. The operator regulation data may include traffic regulations (e.g., traffic laws) for the operator's geographical region. For example, the traffic regulations may include regulations for speed limits, traffic signals, right-of-way, lane usage, passing, seat belts, parking rules, mobile use, and the like.

At process block 108, the vehicle regulation system 12 may obtain vehicle operation regulation data associated with an operational geographic area. That is, at process block 110, the vehicle regulation system 12 may identify a geographical region associated with operation of the vehicle 16. In an embodiment, the vehicle regulation system 12 may identify the operational geographical area by receiving real-time location data from the sensors 18, such as the GPS coordinates. In another embodiment, the vehicle regulation system 12 may receive an input from the operator transmitted to network 20 via the vehicle system 14 or via the mobile device of the operator indicative of the operational geographical area.

At process block 112, the vehicle regulation system 12 may query the database 22 using a key associated with the operational geographical area to obtain vehicle operation regulation data associated with the operational geographical area. As described above, the database 22 may return the corresponding record containing the operation regulation data associated with the operational geographical area. The operation regulation data may include the traffic regulations for the operational geographical area.

After obtaining the operator regulation data and the vehicle operation regulation data, at process block 114, the vehicle regulation system 12 may compare the operator regulation data with the vehicle operation regulation data to identify mismatched regulation data between the operator regulation data and the vehicle operation regulation data. For example, the vehicle regulation system may write an SQL query and compare the two entries in the database 22 to identify the records with differing values. As another example, the vehicle regulation system 12 may implement an algorithm to parse each of the operator regulation data and the vehicle operation regulation data and compare the corresponding fields. The mismatched regulation data may include a difference in the records of the operator regulation data and the vehicle regulation data. Further, the mismatched regulation data may indicate the operator is unfamiliar with the vehicle operation regulation data of the geographical region the operator is currently operating the vehicle 16 within due to the differences in the regulation data. For example, the operator regulation data may include data for a traffic sign for yielding in America as 'Yield' and the operator regulation data may include data for the traffic sign for yielding in Mexico as 'Ceda el Paso.' The vehicle regulation system 12 may identify this difference in the data as the mismatched regulation data.

At process block 116, the vehicle regulation system 12 may determine the real-time location data associated with a real-time location of the operation of the vehicle. The real-time location data may include the location of the vehicle 16, data regarding the vehicle operation regulations within a threshold distance (e.g., 5 feet, 10 feet, 15 feet, and so on) of the real-time location of the vehicle 16, and data regarding the vehicle operation regulations outside the threshold distance. In an embodiment, the real-time location data may include objects such as a traffic sign and/or a traffic light within the threshold distance of the vehicle 16. For example, the vehicle regulation system 12 may obtain image data from the sensors 18 (e.g., a camera of the sensors 18) of the traffic sign and/or traffic light within the threshold distance of the vehicle 16 and may analyze the image data to detect the traffic sign and/or the traffic light within the image data. In another embodiment, the real-time location data may be determined by the vehicle regulation system 12 based on the location of the vehicle 16. As an example, the vehicle regulation system 12 may determine the vehicle 16 is on a particular route within the geographical region and determine at a particular location a distance (e.g., a mile, three miles, five miles, and so on) from the vehicle 16 is the location of the traffic sign. Thus, the traffic sign and/or the traffic light may not be within the threshold distance of the vehicle 16 but may still be predicted as coming into view of the vehicle 16 after some time period.

Further, at process block 118, the vehicle regulation system 12 may determine whether the real-time location data is associated with the mismatched regulation data. That is, the vehicle regulation system 12 may determine that the real-time location data is similar to the mismatched regulation data. Thus, the operator may be unfamiliar with the real-time location data based on the association with the mismatched regulation data and the differences identified in the mismatched regulation data. As an example, the vehicle regulation system 12 may determine the upcoming yield sign is in a different language from the geographical region the operator is associated with.

If the vehicle regulation system 12 determines the real-time location data is not associated with the mismatched regulation data, the method 100 may proceed to process block 120. At process block 120, the vehicle regulation system 12 may refrain from providing a mismatched regulation indication to the operator. That is, the operator regulation data and the vehicle operation regulation data may be the same or similar, and thus the mismatched regulation indication may not be useful to the operator.

Referring back to process block 118, if the vehicle regulation system 12 determines the real-time location data is associated with the mismatched regulation data then the method 100 may proceed to process block 122. At process block 122, the vehicle regulation system 12 may determine an upcoming mismatched regulation indication to present, a time of display, and a location of display based on a portion of the mismatched regulation data associated with the real-time location data. The mismatched regulation indication may include the regulation in a format the operator is familiar with based on the operator regulation data. The vehicle regulation system 12 may determine the upcoming traffic regulation that the operator is unfamiliar with based on the mismatched regulation data. The vehicle regulation system 12 may also determine when to display the mismatched regulation indication based on the distance from the vehicle 16 of the vehicle operation regulation and the location of the display. For example, the vehicle regulation system 12 may determine the operator is arriving at a red light in a right turn lane and determine to display in the front windshield that right turn is not permitted in the geographical region 50 feet before the driver arrives at the red light. As another example, the vehicle regulation system 12 may determine the traffic regulation will be on a sign the right side of the roadway, and thus may determine to overlay the mismatched regulation indication over or next to the sign for display to the operator. Thus, the vehicle regulation system 12 may determine a suitable area for the display based on the location of the traffic regulation and/or the distance from the traffic regulation. In some embodiments, the vehicle regulation system 12 may use characteristics of the operator, such as height, to determine the suitable area for display.

At process block 124, the vehicle regulation system 12 may generate and display the mismatched regulation indication at the determined time and location. For example, the vehicle regulation system 12 may display the mismatched indication on a display within the dashboard of the vehicle 16 and/or on the smart glass (e.g., on a windshield, driver and/or passenger windows, rearview mirror, a back cabin window, and so on) of the vehicle 16.

Further, at process block 126, the vehicle regulation system 12 may optionally store an indication of the mismatched regulation indication, the determined time and location, the real-time location, and an indication of the operator's geographical area and the operational geographical area. In an embodiment, the vehicle regulation system 12 may store the indication of the mismatched regulation indication, the determined time and location, the real-time location, and the indication of the operator's geographical area and the operational geographical area in the database 22. In this manner, when the vehicle regulation system 12 is employed by a subsequent operator from the same geographical area traveling in the operational geographical area, the vehicle regulation system 12 may retrieve the previously determined data to display to the subsequent operator. As such, the vehicle regulation system 12 may more efficiently retrieve the determined mismatched regulation indication and determined time and location for display.

Figure 4:
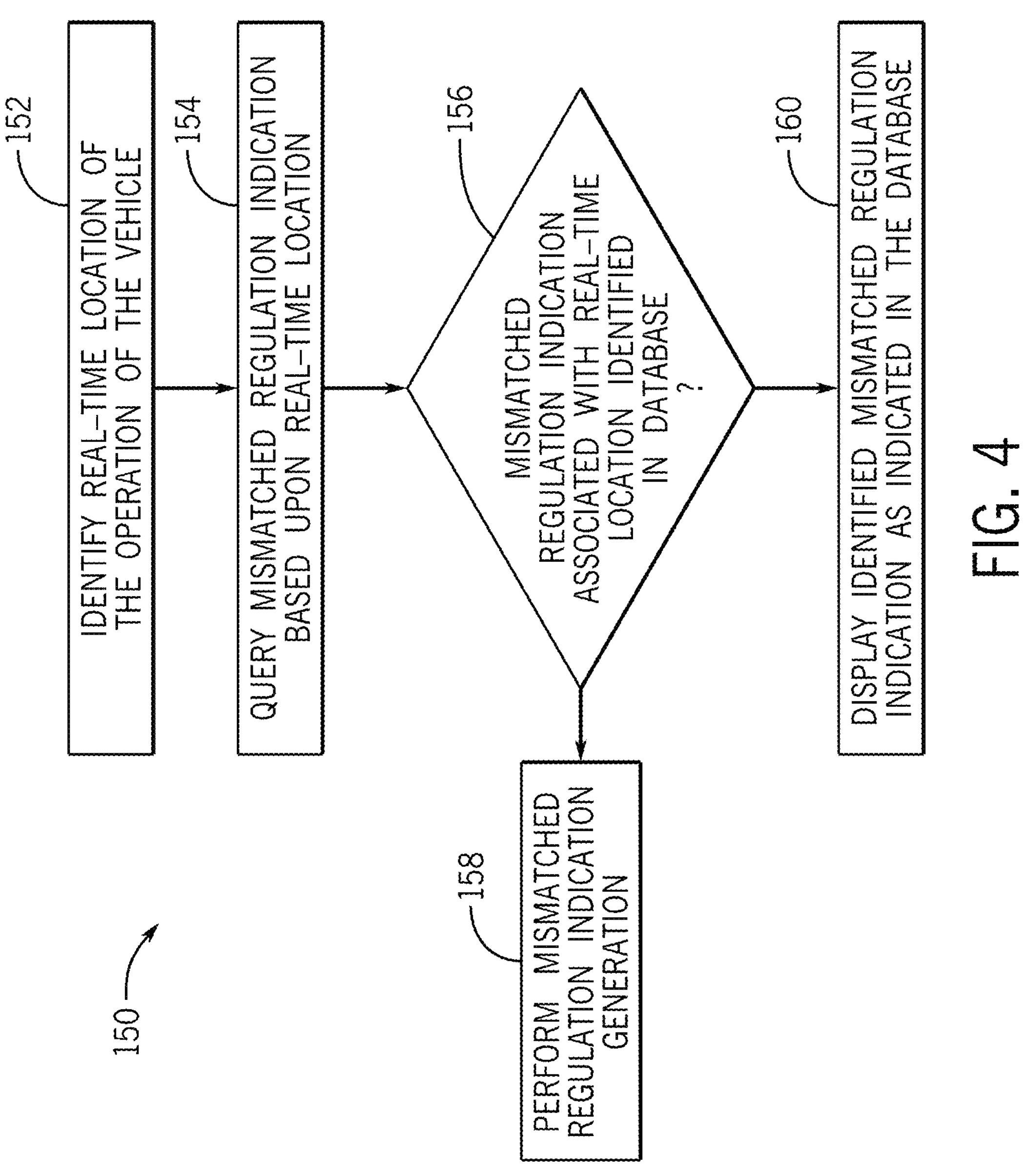
FIG. 4 is a flowchart of a method for displaying the mismatched regulation indication stored in a database using the vehicle regulation system of FIG. 1, in accordance with aspects of the present disclosure.

FIG. 4 is a flowchart of a method 150 for displaying the mismatched regulation indication stored in the database 22. At process block 152, the vehicle regulation system 12 may identify the real-time location of the operation of the vehicle 16 by receiving, for example, real-time location data from the sensors 18. At process block 154, the vehicle regulation system 12 may query the database 22 for the mismatched regulation indication based upon the real-time location. At process block 156, the vehicle regulation system 12 may determine whether the mismatched regulation indication is associated with the real-time location identified in the database 22. That is, the vehicle regulation system 12 may determine whether the mismatched regulation indication has already been identified and generated for a previous operator with an associated operator geographical area at the real-time location.

If the vehicle regulation system 12 is unable to identify the mismatched regulation indication in the database 22 (e.g., the mismatched indication has not previously been determined and/or is not stored in the database 22) then the vehicle regulation system may proceed to process block 158. At process block 158, the vehicle regulation system 12 may perform the method 100 for generating and displaying the mismatched regulation indication.

Referring back to process block 156, if the vehicle regulation system 12 identifies the mismatched regulation indication in the database 22, then the vehicle regulation system 12 may proceed to process block 160. At process block 160, the vehicle regulation may display the identified mismatched regulation indication as indicated in the database 22. As described above, the vehicle regulation system 12 may determine the suitable area to display the mismatched regulation indication, which may be stored in the database 22. The vehicle regulation system 12 may use the previous determination and display the mismatched regulation indication to the operator in the same manner, improving efficiency for the vehicle regulation system 12 and reducing a use of computational resources.

Figure 5:
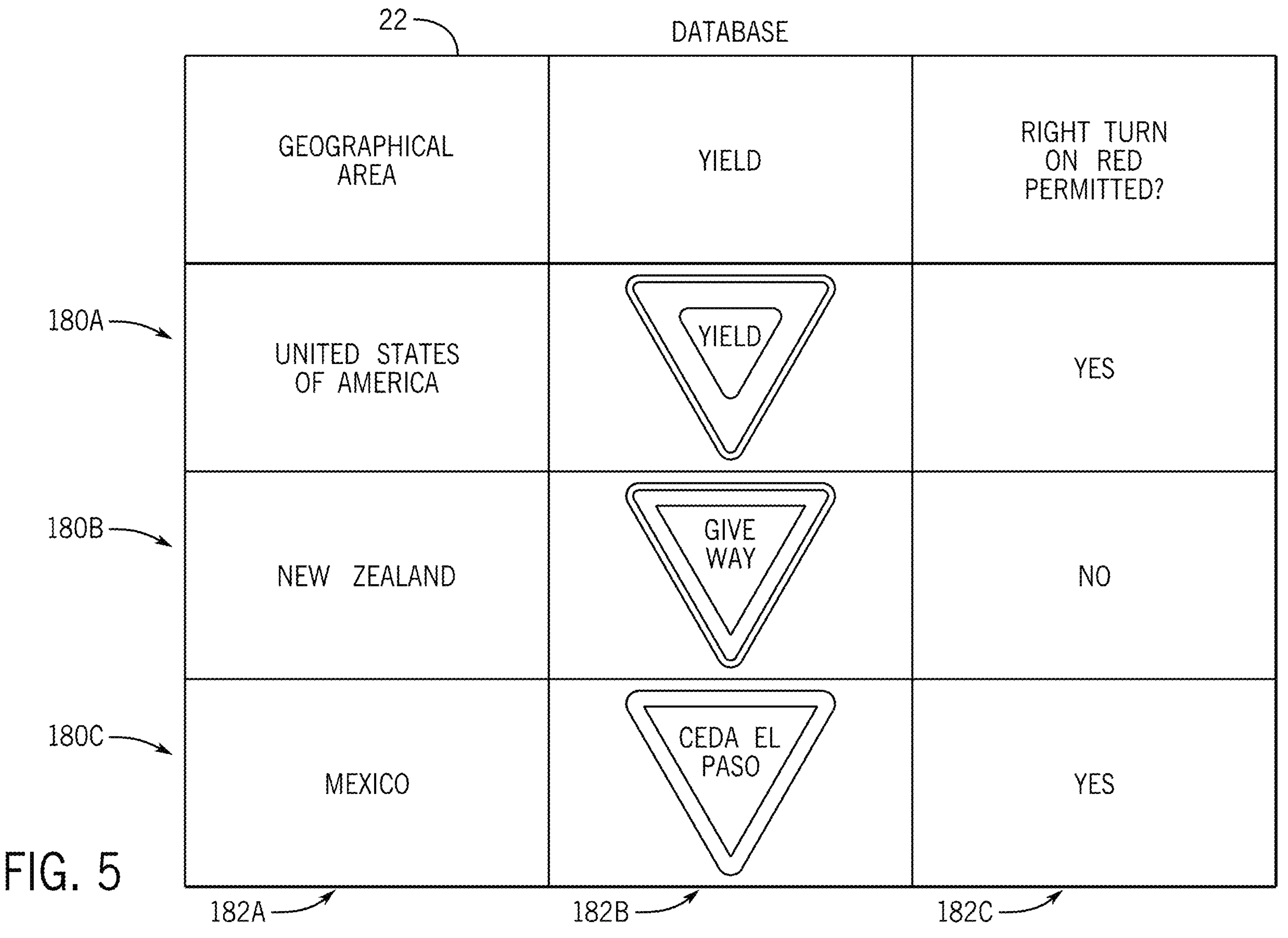
FIG. 5 is an example illustration of example data stored in the database by the vehicle regulation system, in accordance with aspects of the present disclosure.
Figure 6:
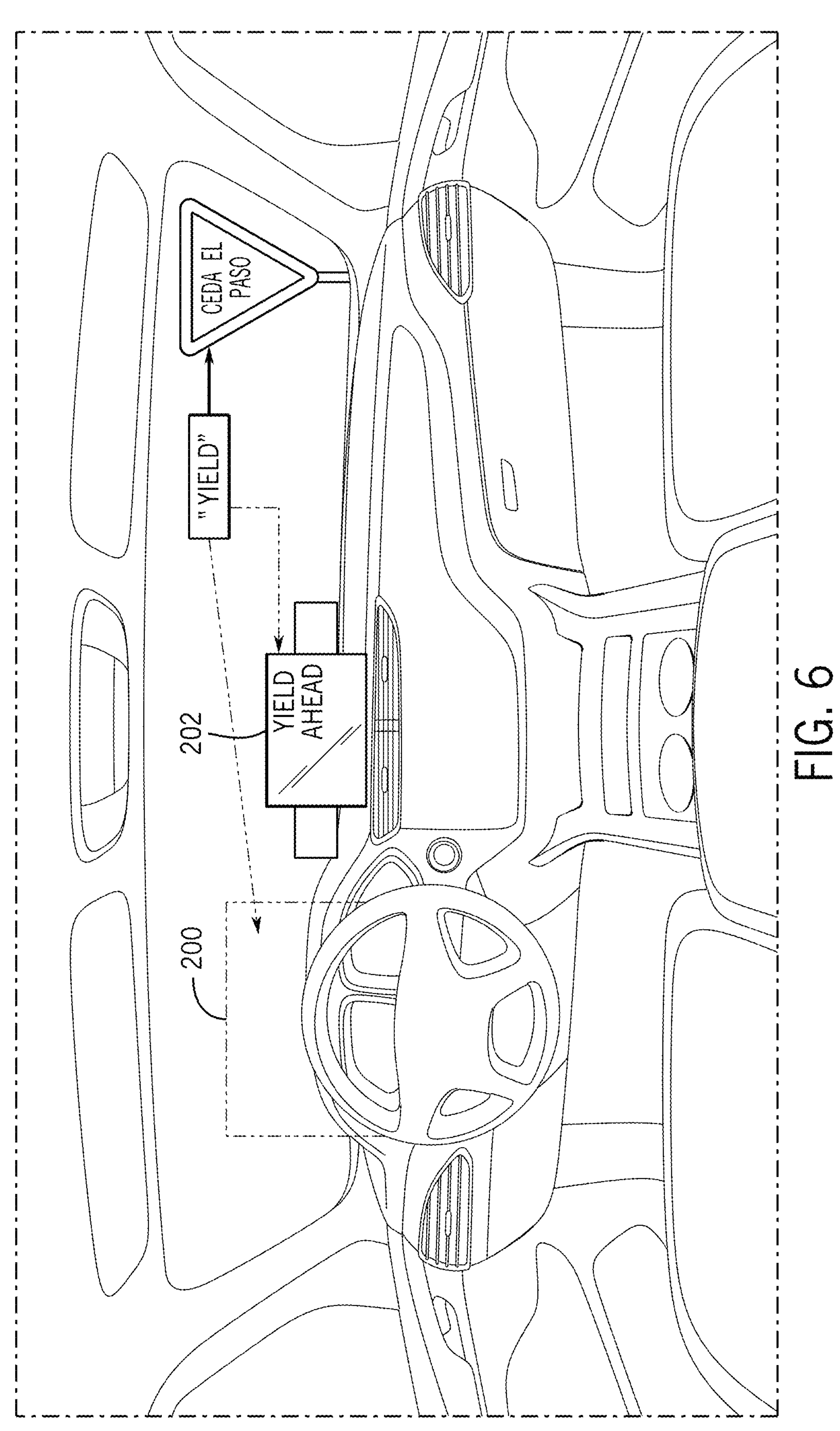
FIG. 6 is an example illustration of an example mismatched regulation indication presented to a user, in accordance with aspects of the present disclosure.

With the foregoing in mind, FIG. 5 is an example illustration of example data stored in the database 22 using the vehicle regulation system 12 of FIG. 1, in accordance with aspects of the present disclosure. As illustrated, the database may contain one or more records 180A, 180B, and 180C (e.g., rows) and one or more fields 182A, 182B, and 182C (e.g., columns). Each of the one or more records 180 may be indicative of the geographical area. Additionally, each of the one or more fields 182 may be indicative of information regarding the operator regulation data and/or the vehicle operation regulation data associated with the geographical area. As illustrated in FIG. 6, a first field 182A may include a geographical area, a second field 182B may include a first traffic regulation associated with 'yield,' and a third field 182C may include a second traffic regulation associated with 'right turn permitted on red.' In an embodiment, the third field 182C may enable two possible values, such as a yes or a no. Further, a first record 180A may include data for 'United States of America,' a second record 180B may include data for 'New Zealand,' and a third record 180C may include data for 'Mexico.'

The first record 180A may include a yield sign used in the United States, with accompanying terminology in a language used in the traffic regulation associated with the geographical region, which is 'YIELD' in English for the United States. Further, the first record 180A may include regulation information indicating whether a right turn on red is permitted in the United States. As described above, the third field may enable the two values of a yes value or a no value. Thus, for the United States, because right turns on red are permitted, the yes value may be stored in the database 22.

The second record 180B may include the yield sign used in New Zealand, with the accompanying terminology in the language used in the traffic regulation and associated with the geographical region, which is 'GIVE WAY' in English. Further, the first record 180A may include information indicating whether the right turn on red is permitted in New Zealand. Thus, for New Zealand, because right turns on red are not permitted, the no value may be stored in the database 22.

The third record 180C may include the yield sign used in Mexico, with the accompanying terminology in the language used in the traffic regulation and associated with the geographical region, which is 'CEDA EL PASO' in Spanish. Further, the third record 180C may include the information indicating whether the right turn on red is permitted in Mexico. Thus, for Mexico, because right turns are permitted, the yes value may be stored in the database 22.

As an example, the vehicle regulation system 12 may identify the geographical area associated with the operator of the vehicle 16 is the United States, and may query the database 22 using the key associated with the operator's geographical area to obtain the operator regulation data associated with the operator's geographical area. Further, the vehicle regulation system 12 may identify the geographical area associated with the operation of the vehicle 16 is New Zealand, and may query the database 22 using the key associated with the operational geographical area to obtain the vehicle operation regulation data for New Zealand. The vehicle regulation system 12 may compare whether the right turn is permitted in the United States to whether the right turn is permitted in New Zealand and identify that the United States has the yes value and New Zealand has the no value. Thus, the vehicle regulation system may identify the regulation data is mismatched and store the mismatched regulation indication.

As another example, the geographical area associated with the operation of the vehicle 16 may be Mexico. The vehicle regulation system 12 may compare whether the yield sign in the United States and the yield sign in Mexico is mismatched by identifying the language in Mexico (e.g., Spanish) compared to the language in the United States (e.g., English). Further, as illustrated in FIG. 6 the vehicle regulation system 12 may determine the upcoming mismatched regulation indication to present, the time of display, and the location of display. For example, the vehicle regulation system 12 may receive image data of an environment surrounding the vehicle 16 and perform a distance analysis to detect the distance (e.g., 5 feet, 15 feet, 30 feet, and so on) between the vehicle 16 and the traffic regulation. The vehicle regulation system may determine to present the mismatched regulation indication to the operator via an identified suitable display, such as a windshield 200 and/or a dashboard display 202.

While FIG. 5 provides one example data organization of database 22 for storing regulation data for multiple geographies, other data organizations may be used in conjunction with and/or as an alternative to the example data organization of FIG. 5. As sign identification may require rapid identification and translation (e.g., due to a moving vehicle approaching the sign to be translated), data organizations that enable key pairs (e.g., a sign visual and a geography) (e.g., Ceda El Paso sign when driving in Mexico) to be quickly searched to understand a category of the sign (e.g., "YIELD") and obtain a translation of this category of sign (e.g., "YIELD" of United States of America (the driver's typical driving location) are desired.

As shown in FIG. 6, the vehicle regulation system 12 may identify one or more areas as the suitable display. For example, the vehicle regulation system 12 may identify the windshield 200 and/or the dashboard display 202 as the suitable display. Thus, when the vehicle regulation system 12 detects the vehicle 16 is within a detected threshold distance (e.g., 50 feet) of the 'CEDA EL PASO' sign, the vehicle regulation system 12 may display 'YIELD' on the windshield 200 (via the heads-up display) and/or on the dashboard display 202. Thus, the vehicle regulation system 12 may identify and present the vehicle regulation in a manner that may enable the operator to understand and follow the vehicle regulation.

As may be appreciated, the current techniques may provide computer-implemented provision of regulation translations that are more understandable by a driver. The translations may dynamically change from driver to driver, based upon custom-identified familiarity with particular translated regulations (e.g., based upon identifying a typical driving geography of the driver (e.g., via an indication, such as historical driving data, from an electronic device of the driver (e.g., the driver's phone via a map application). By providing custom translations for particular drivers, different experiences may be observed in the same car by different drivers. For example, a driver that typically drives in Mexico may see Mexican regulation translations, while a United States Driver that rents the same car may see United States regulation translations.

While only certain features of the embodiments described herein have been illustrated and described herein, many modifications and changes will occur to those skilled in the art. It is, therefore, to be understood that the appended claims are intended to cover all such modifications and changes as fall within the true spirit of the embodiments described herein. In addition, although the foregoing description is detailed as being performed by a quantum computer, it should be noted that classical processing and computer systems may perform the embodiments described herein.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A vehicle regulation system comprising:

a plurality of displays disposed within a vehicle; and processing circuitry configured to:

receive a first set of regulation data associated with a first geographical area and a second set of regulation data associated with a second geographical area;

compare the first set of regulation data and the second set of regulation data;

identify a mismatched regulation based on the comparison;

determine first location data associated with a location of operation of the vehicle is associated with the mismatched regulation;

determine second location data associated with a location of the mismatched regulation and a distance of the vehicle from the mismatched regulation;

identify one of the plurality of displays to display the mismatched regulation based on the location of the mismatched regulation and the distance of the vehicle from the mismatched regulation; and display the mismatched regulation via the one of the plurality of displays.

2. The vehicle regulation system of claim 1, wherein the processing circuitry is configured to determine a time and a location to display the mismatched regulation via the one of the plurality of displays.

3. The vehicle regulation system of claim 2, wherein the processing circuitry is configured to determine the time to display the mismatched regulation based on the location of the mismatched regulation, the distance of the vehicle from the mismatched regulation, one or more characteristics of an operator, or any combination thereof.

4. The vehicle regulation system of claim 1, wherein the processing circuitry is configured to identify the first geographical area based on an operator's geographical area and the second geographical area based on an operational geographical area of the vehicle.

5. The vehicle regulation system of claim 4, wherein the processing circuitry is configured to query a database using a key associated with the operator's geographical area to obtain the first set of regulation data.

6. The vehicle regulation system of claim 4, wherein the processing circuitry is configured to query a database using a key associated with the operational geographical area to obtain the second set of regulation data.

7. The vehicle regulation system of claim 4, wherein the first set of data comprises operator regulation data associated with the operator's geographical area and the second set of data comprises vehicle operation regulation data associated with the operational geographical area of the vehicle.

8. The vehicle regulation system of claim 4, wherein the processing circuitry is configured to receive an input indicative of the operator's geographical area.

9. The vehicle regulation system of claim 1, wherein the processing circuitry is configured to store an indication of the mismatched regulation and the first location data.

10. The vehicle regulation system of claim 1, wherein the first location data comprises a location of the vehicle, vehicle operation regulations within a threshold distance, the vehicle operation regulations outside the threshold distance, or any combination thereof.

11. The vehicle regulation system of claim 1, wherein the plurality of the displays comprise a windshield of the vehicle, a window of the vehicle, and a dashboard display.

12. The vehicle regulation system of claim 1, comprising a database, wherein the database comprises one or more records and one or more fields.

13. The vehicle regulation system of claim 12, wherein each of the one or more records is associated with a respective geographical area and each of the one or more fields is associated with a respective regulation.

14. A method, comprising:

receiving, via processing circuitry, a first set of regulation data associated with a first geographical area and a second set of regulation data associated with a second geographical area;

comparing, via the processing circuitry, the first set of regulation data and the second set of regulation data;

identifying, via the processing circuitry, a mismatched regulation based on the comparison;

determining, via the processing circuitry, first location data associated with a location of operation of a vehicle is associated with the mismatched regulation;

determining, via the processing circuitry, second location data associated with a location of the mismatched regulation and a distance of the vehicle from the mismatched regulation;

identifying, via the processing circuitry, one of a plurality of displays of the vehicle to display the mismatched regulation based on the location of the mismatched regulation and the distance of the vehicle from the mismatched regulation; and displaying, via the processing circuitry, the mismatched regulation via the one of the plurality of displays.

15. The method of claim 14, comprising determining, via the processing circuitry, a time to display the mismatched regulation.

16. The method of claim 14, comprising identifying, via the processing circuitry, the first geographical area based on an operator's geographical area and the second geographical area based on an operational geographical area of the vehicle.

17. One or more tangible, non-transitory computer-readable media storing instructions that, when executed by processing circuitry, are configured to cause the processing circuitry to:

receive a first set of regulation data associated with a first geographical area and a second set of regulation data associated with a second geographical area;

compare the first set of regulation data and the second set of regulation data;

identify a mismatched regulation based on the comparison;

determine first location data associated with a location of operation of a vehicle is associated with the mismatched regulation;

determine second location data associated with a location of the mismatched regulation and a distance of the vehicle from the mismatched regulation;

identify one of the plurality of displays to display the mismatched regulation based on the location of the mismatched regulation and the distance of the vehicle from the mismatched regulation; and display the mismatched regulation via the one of the plurality of displays.

18. The one or more tangible, non-transitory computer-readable media of claim 17, wherein the instructions, when executed by the processing circuitry, are configured to query a database using a first key associated with an operator's geographical area to obtain the first set of regulation data.

19. The one or more tangible, non-transitory computer-readable media of claim 18, wherein the instructions, when executed by the processing circuitry, are configured to query the database using a second key associated with an operational geographical area of the vehicle to obtain the second set of regulation data.

20. The one or more tangible, non-transitory computer-readable media of claim 18, wherein the instructions, when executed by the processing circuitry, are configured to query the database to obtain the first set of regulation data and the second set of regulation data using structured query language.

* * * * *